United States Patent
Otis et al.

(10) Patent No.: US 12,441,641 B2
(45) Date of Patent: Oct. 14, 2025

(54) BUBBLE GENERATOR

(71) Applicant: PULSED BURST SYSTEMS, LLC, Richfield, WI (US)

(72) Inventors: Charles Otis, Milwaukee, WI (US); Kenneth E Neu, Hartford, WI (US)

(73) Assignee: PULSE BURST SYSTEMS, LLC, Richfield, WI (US)

( * ) Notice: Subject to any disclaimer, the term of this patent is extended or adjusted under 35 U.S.C. 154(b) by 274 days.

(21) Appl. No.: 18/067,064

(22) Filed: Dec. 16, 2022

(65) Prior Publication Data

US 2023/0331606 A1    Oct. 19, 2023

Related U.S. Application Data

(63) Continuation of application No. 16/381,509, filed on Apr. 11, 2019, now Pat. No. 11,560,327.

(60) Provisional application No. 62/656,342, filed on Apr. 11, 2018, provisional application No. 62/728,475, filed on Sep. 7, 2018.

(51) Int. Cl.
| | |
|---|---|
| *C02F 3/22* | (2023.01) |
| *B01F 23/231* | (2022.01) |
| *C02F 1/24* | (2023.01) |
| *B01F 23/237* | (2022.01) |
| *B01F 101/00* | (2022.01) |
| *C02F 103/42* | (2006.01) |

(52) U.S. Cl.
CPC ...... *C02F 3/223* (2013.01); *B01F 23/231262* (2022.01); *C02F 1/24* (2013.01); *B01F 23/231265* (2022.01); *B01F 23/237611* (2022.01); *B01F 2101/305* (2022.01); *C02F 2103/42* (2013.01)

(58) Field of Classification Search
CPC ...... B01F 23/231262; B01F 23/237611; B01F 23/231265; B01F 2101/305; C02F 1/24; C02F 3/223; C02F 2103/42
USPC ................ 261/30, 35, 26, 74, 109, 123, 126
See application file for complete search history.

(56) References Cited

U.S. PATENT DOCUMENTS

| | | |
|---|---|---|
| 1,339,137 A | 5/1920 | Rogers |
| 1,741,571 A | 12/1929 | Ives |

(Continued)

FOREIGN PATENT DOCUMENTS

| | | |
|---|---|---|
| EP | 0382340 | 12/1995 |
| WO | WO2013/039626 | 3/2013 |

OTHER PUBLICATIONS

Neu et al. "How to Reduce the Operating Cost of Your Wastewater Treatment Plant with Efficient Mixing" WWO Conference, Wisconsin Dells, Waster& Wastewater Treatment Solutions, (retrieved Jul. 21, 2019 from the Internet), pp. 1-89.

(Continued)

*Primary Examiner* — Charles S Bushey
(74) *Attorney, Agent, or Firm* — RYAN KROMHOLZ & MANION SC

(57) ABSTRACT

A bubble generator including a container having a side wall and a top wall defining a cavity. An insert is located within the cavity defining a gas path with a trap portion. The gas path being in communication with an exit in the container. The cavity including an opening receiving a gas accumulating within the cavity, the gas path allowing the accumulating gas to escape through the exit once the accumulating gas reaches a predetermined level proximate the trap portion.

15 Claims, 8 Drawing Sheets

(56) References Cited

U.S. PATENT DOCUMENTS

| | | |
|---|---|---|
| 3,133,507 A | 5/1964 | DerSter |
| 3,289,609 A | 12/1966 | Palo |
| 3,592,450 A | 7/1971 | Rippon |
| 3,788,616 A | 1/1974 | Clough, Jr. |
| 4,092,087 A | 5/1978 | Anthony et al. |
| 4,293,506 A | 10/1981 | Lipert |
| 4,356,131 A | 10/1982 | Lipert |
| 4,439,316 A | 3/1984 | Kozima |
| 4,752,421 A | 6/1988 | Makino |
| 4,789,503 A | 12/1988 | Murphy |
| 4,828,696 A | 5/1989 | Makino |
| 4,911,838 A | 3/1990 | Tanaka |
| 5,312,232 A | 5/1994 | Horton et al. |
| 5,364,529 A | 11/1994 | Morin et al. |
| 5,605,653 A | 2/1997 | DeVos |
| 5,609,754 A | 3/1997 | Stuth |
| 6,162,020 A | 12/2000 | Kanda |
| 6,190,554 B1 | 2/2001 | Mandt |
| 6,969,465 B2 | 11/2005 | Zha et al. |
| 7,267,328 B2 | 9/2007 | Witheridge |
| 7,294,255 B2 | 11/2007 | Kondo |
| 7,600,741 B2 | 10/2009 | Lipert |
| D637,208 S | 5/2011 | Zauner et al. |
| 8,047,808 B2 | 11/2011 | Kondo |
| 8,137,557 B2 | 3/2012 | Ladouceur |
| 8,292,271 B2 | 10/2012 | Fujisato |
| 8,371,826 B1 | 2/2013 | Johnson et al. |
| 8,871,498 B2 | 10/2014 | Liu |
| 9,073,024 B2 | 7/2015 | Drewry |
| 9,181,120 B2 | 11/2015 | Josse et al. |
| 9,333,464 B1 | 5/2016 | Johnson |
| 9,566,554 B2 | 2/2017 | Wu |
| 9,732,768 B2 | 8/2017 | Ladouceur |
| 10,500,545 B2 | 12/2019 | Lee |
| 10,766,001 B2 | 9/2020 | Koo |
| 10,828,607 B2 | 11/2020 | Min |
| 10,989,228 B2 | 4/2021 | Kondo |
| 11,560,327 B2 * | 1/2023 | Otis ................ B01F 23/231262 |
| 2006/0145366 A1 * | 7/2006 | Thomas ................ B01F 33/409 |
| | | 261/123 |
| 2007/0166171 A1 | 7/2007 | Kondo |
| 2010/0000941 A1 | 1/2010 | Muller |
| 2010/0170847 A1 | 7/2010 | Zha et al. |
| 2011/0049047 A1 | 3/2011 | Cumin et al. |
| 2011/0100907 A1 | 5/2011 | Zha et al. |
| 2011/0198283 A1 | 8/2011 | Zha et al. |
| 2011/0241230 A1 | 10/2011 | Kerfoot |
| 2012/0048801 A1 | 3/2012 | Hong et al. |
| 2012/0061333 A1 | 3/2012 | Zha et al. |
| 2012/0126436 A1 | 5/2012 | Hato |
| 2012/0325742 A1 | 12/2012 | Cumin et al. |
| 2013/0319940 A1 | 12/2013 | Josse et al. |
| 2014/0246104 A1 | 9/2014 | Kondo |
| 2014/0263098 A1 | 9/2014 | Abrams et al. |
| 2015/0063735 A1 | 3/2015 | Murata et al. |
| 2015/0196880 A1 * | 7/2015 | Stone ................ A01K 63/042 |
| | | 210/220 |
| 2018/0353916 A1 | 12/2018 | Kondo |
| 2020/0360873 A1 | 11/2020 | Tharp |
| 2021/0276902 A1 | 9/2021 | Neu |

OTHER PUBLICATIONS

International Search Report and Written Opinion for PCT/US2019/026924, mail date Aug. 6, 2019, 12 pgs.

International Search Report and Written Opinion for PCT/US2019/050101, mail date Nov. 13, 2019, 11 pgs.

* cited by examiner

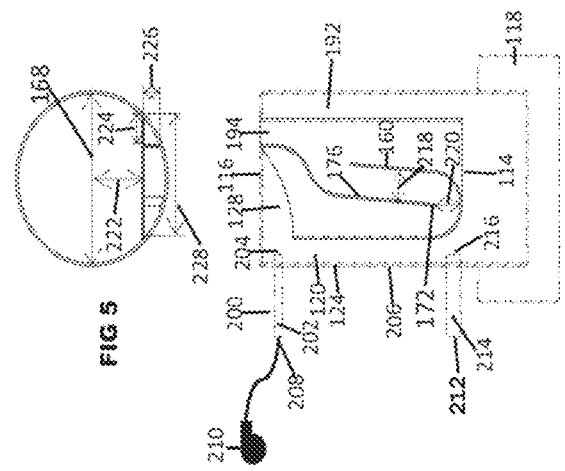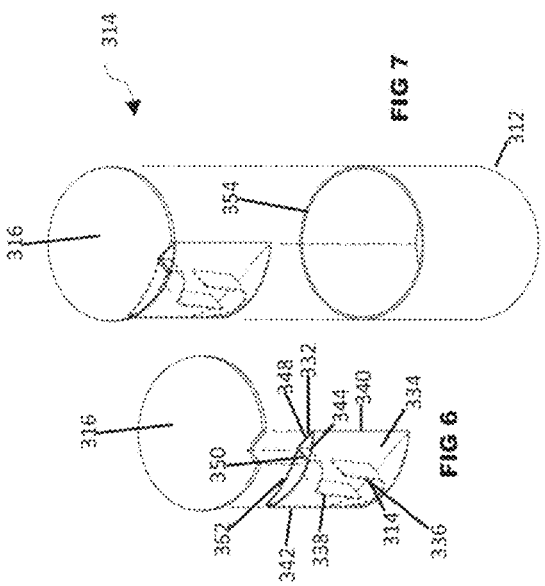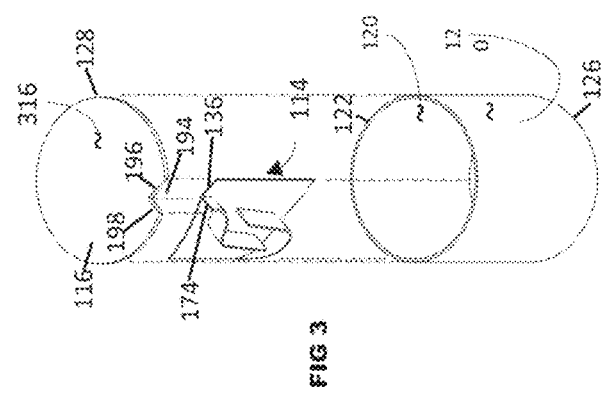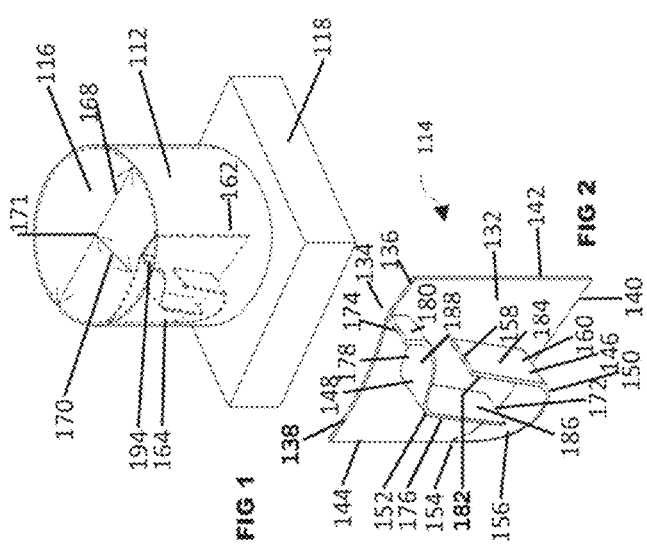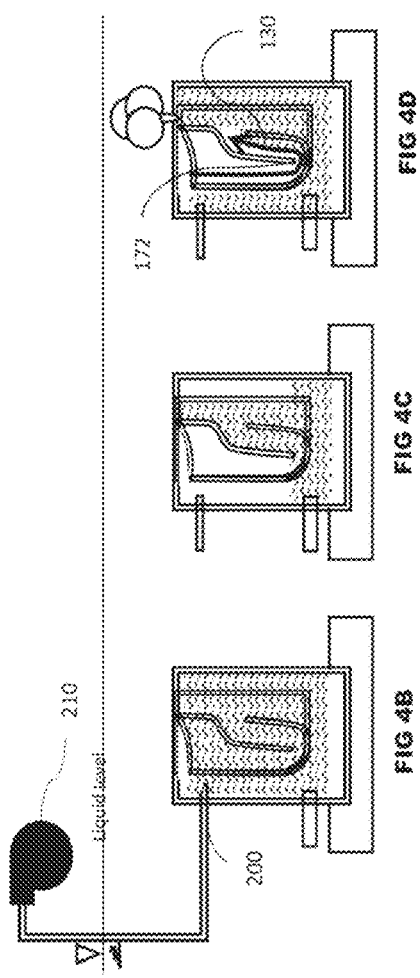

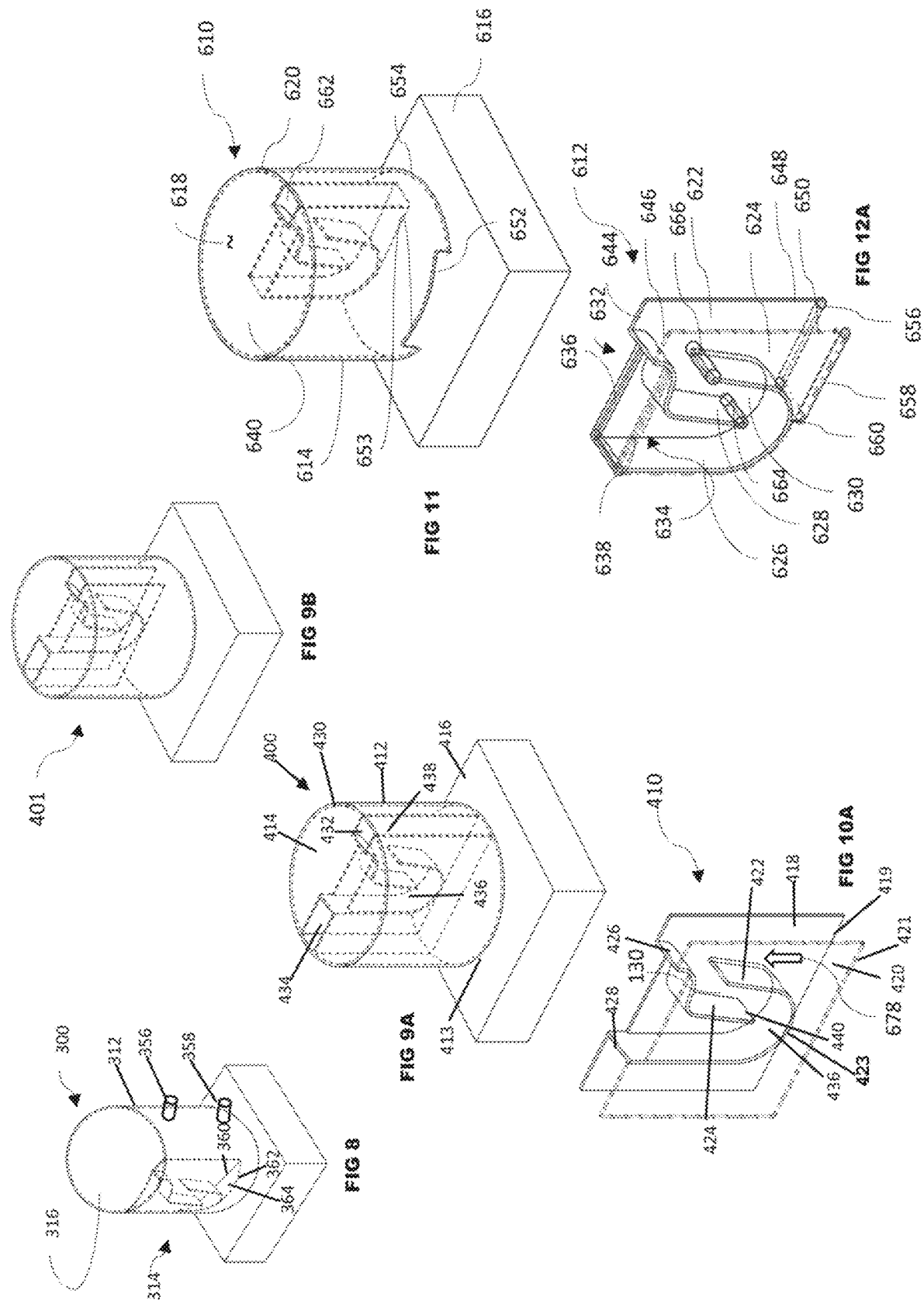

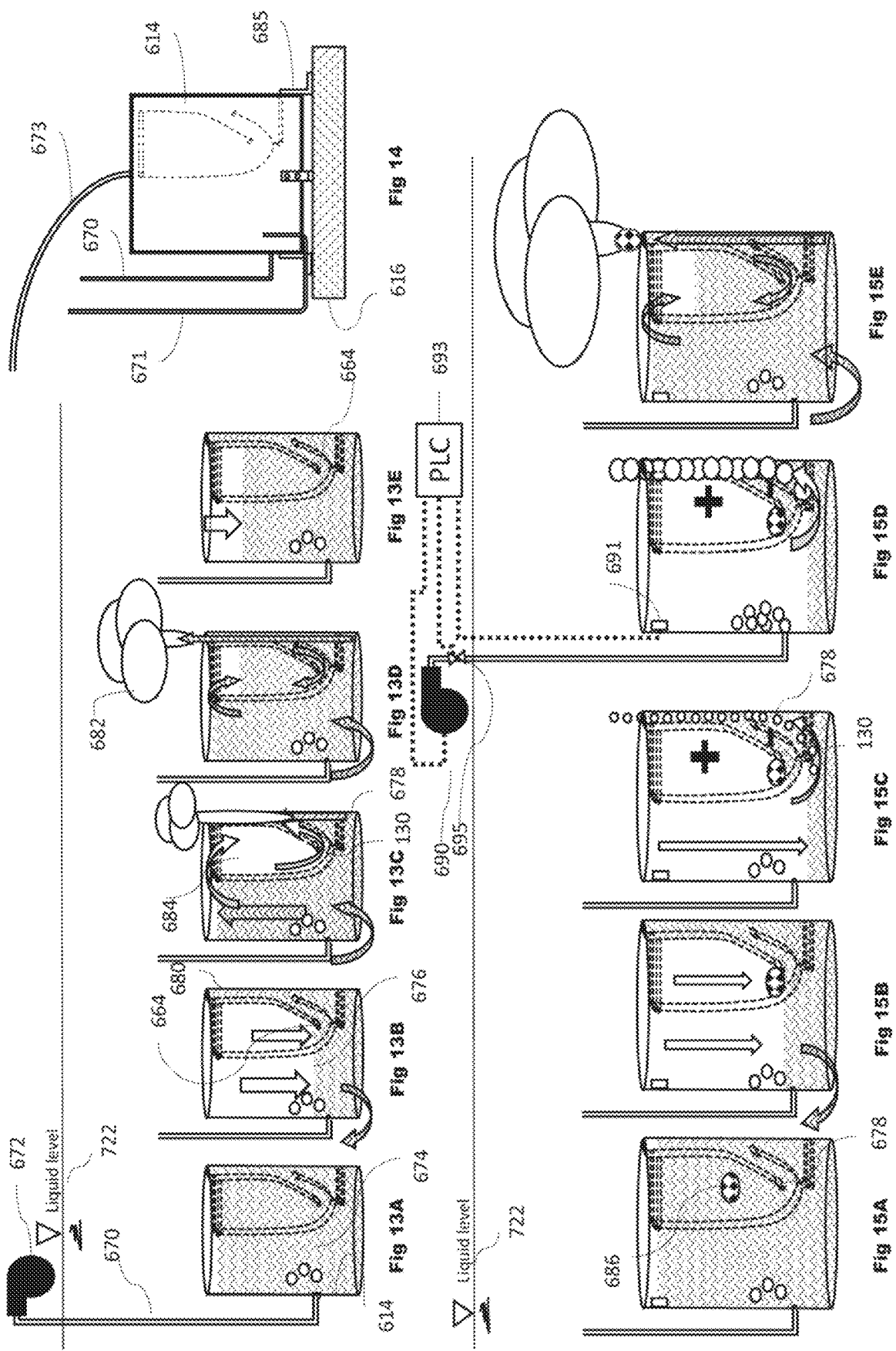

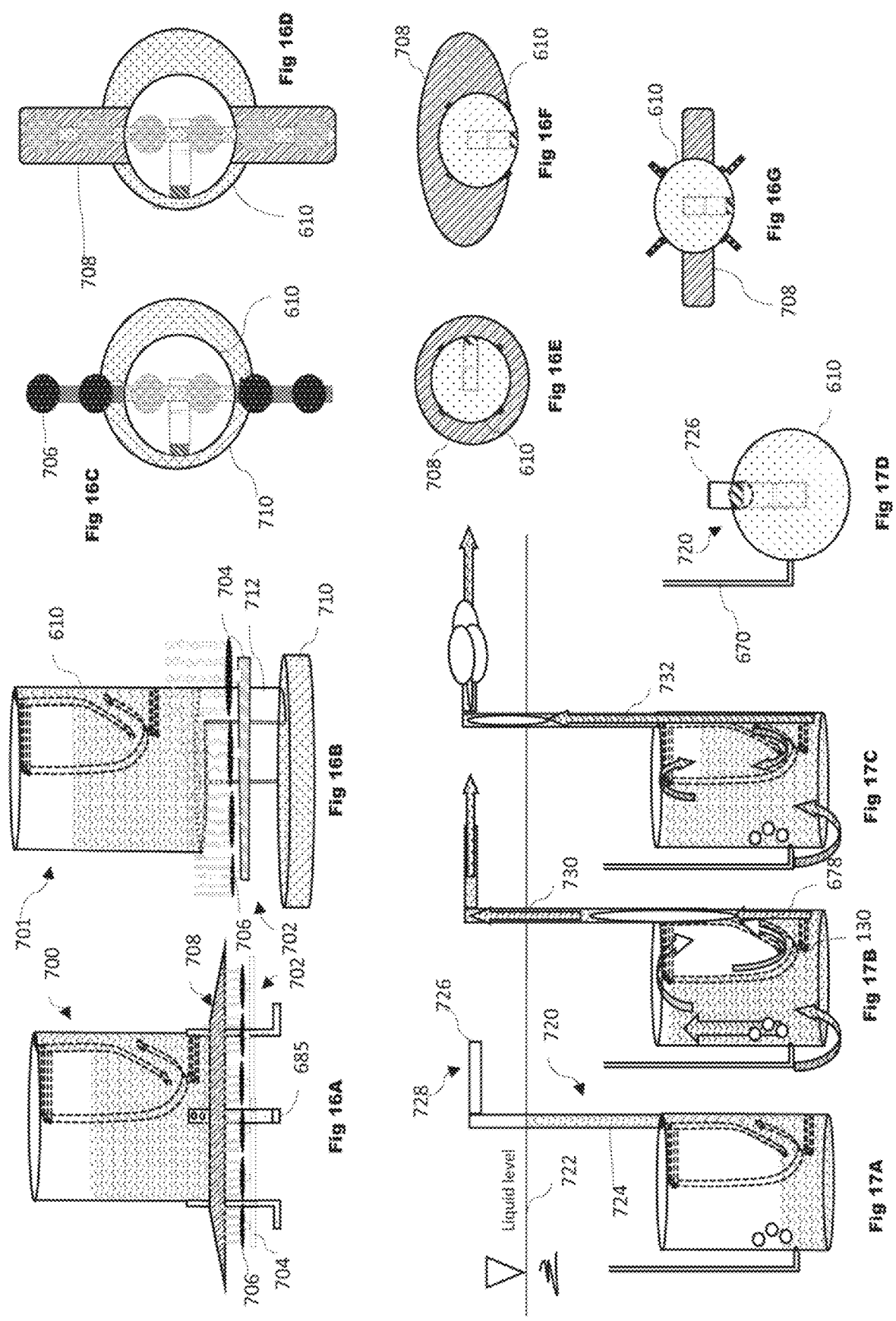

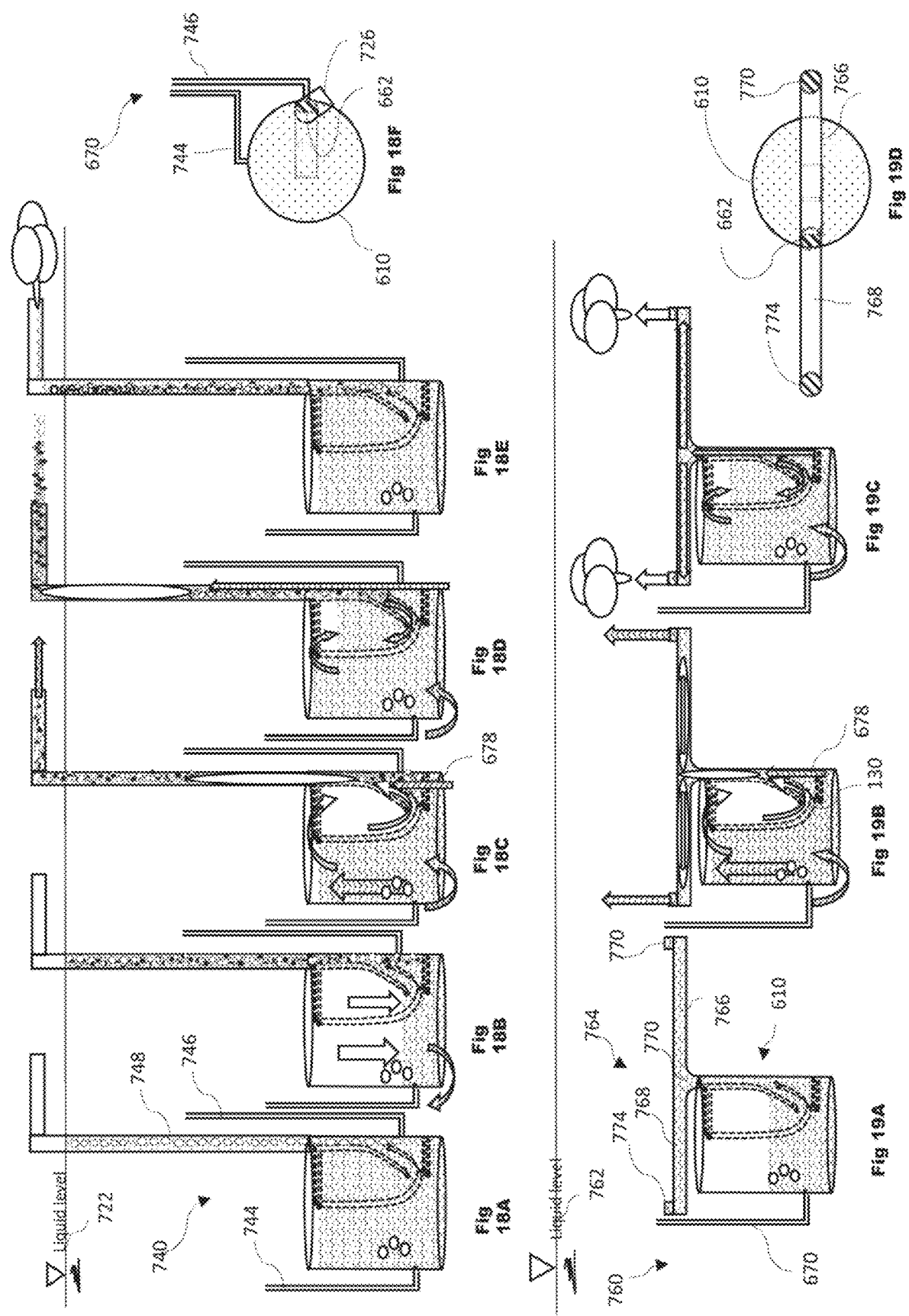

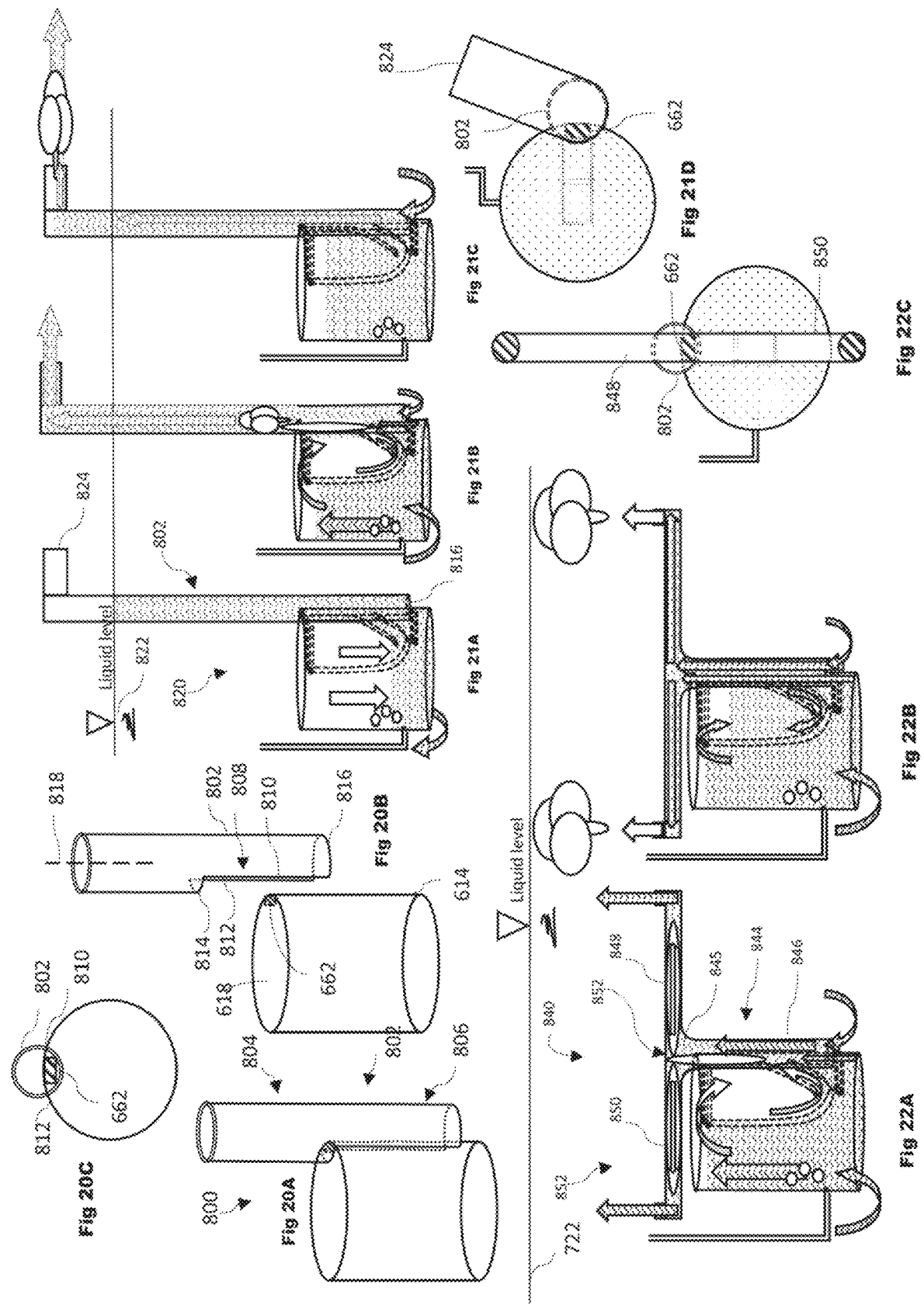

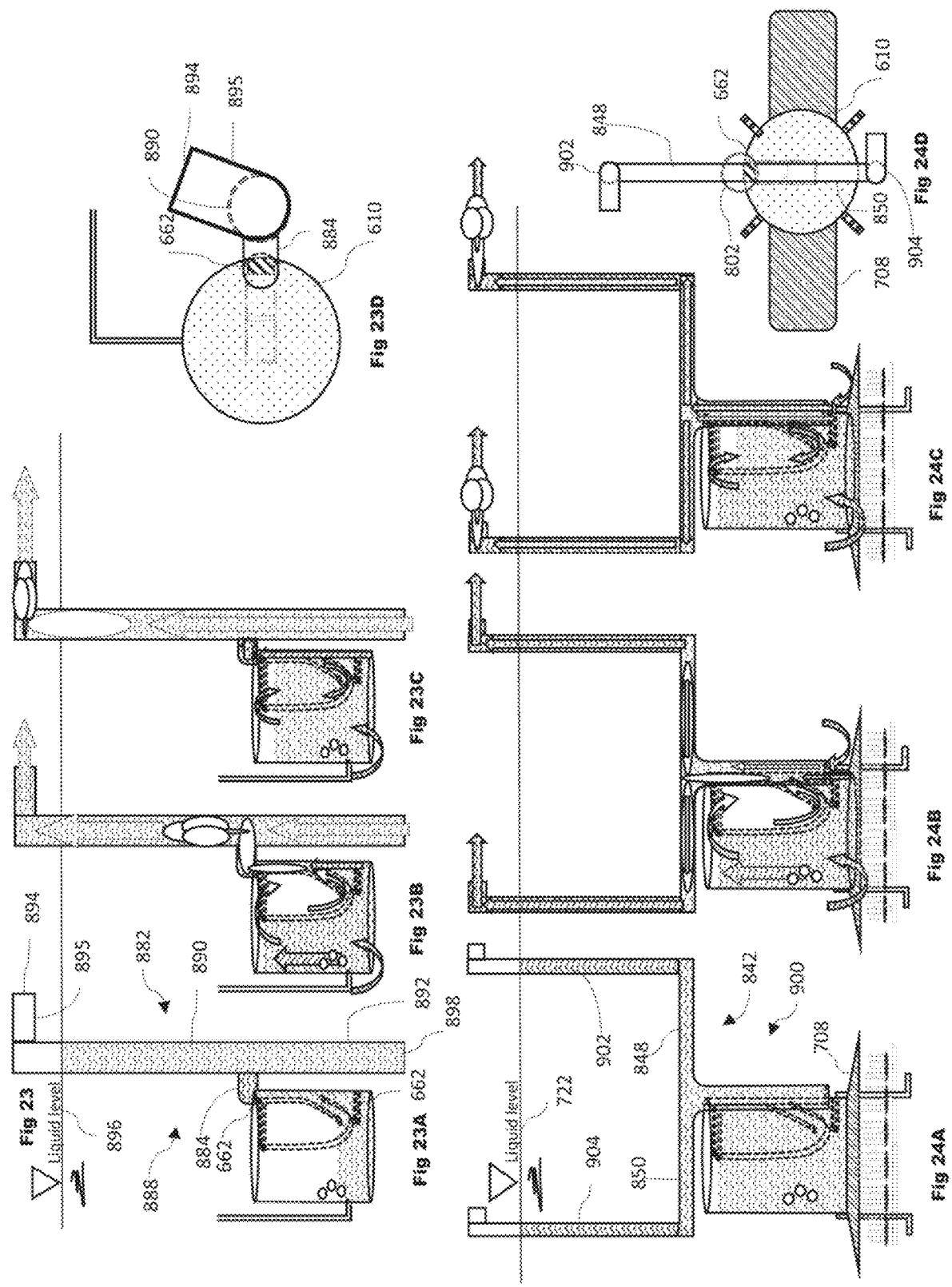

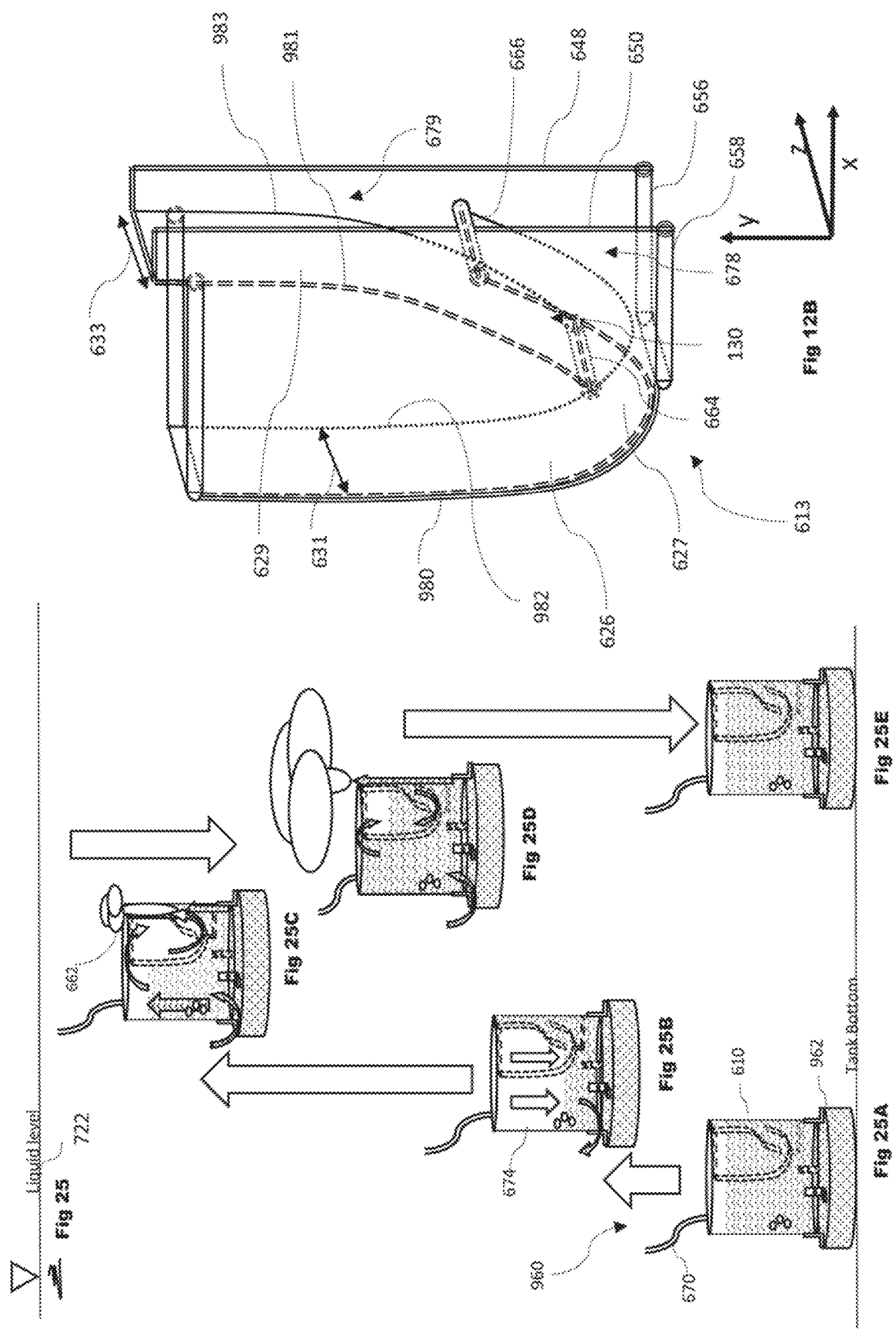

BUBBLE GENERATOR

CROSS-REFERENCE TO RELATED APPLICATIONS

This application is a continuation of co-pending application Ser. No. 16/381,509 filed 11 Apr. 2019 now U.S. Pat. No. 11,560,327 which claims the benefit of U.S. Provisional Application 62/656,342, filed Apr. 11, 2018 entitled BUBBLE GENERATOR and U.S. Provisional Application 62/728,475, filed Sep. 7, 2018 entitled WASTEWATER TREATMENT SYSTEM both of which are incorporated herein by reference in their entirety.

BACKGROUND OF THE INVENTION

The invention generally relates to a bubble generator generally and more specifically to a bubble generating apparatus, method of manufacture, and operation used for both mixing and pumping liquids such as domestic wastewater.

SUMMARY OF THE INVENTION

In one embodiment a bubble generator pump includes an insert sealingly engaged to an inner surface of a container.

In one embodiment a bubble generator includes an insert that is centrally located within and sealingly engaged to an inner surface of a container.

In one embodiment a bubble generator includes a container having a side wall and a top wall defining a cavity. An insert is located within the cavity defining a gas path with a trap portion. The gas path being in communication with an exit in the container. The cavity including an opening receiving a gas accumulating within the cavity, the gas path allowing the accumulating gas to escape through the exit once the accumulating gas reaches a predetermined level proximate the trap portion.

In one embodiment a bubble generator system includes a large bubble generator accumulating a gas and intermittently releasing the majority of the gas. A sensor detects the release of the large bubble event.

In one embodiment a bubble generator system includes a bubble generator providing intermittent pulsed air bubbles in large bubble events including a container having an opening adjacent a lower edge of the container receiving gas from an aeration source spaced below and not in contact with the container. The gas from the aeration source enters the container through the opening free of any connecting conduit. A skirt extends outwardly from the container to guide gas from the aeration source into the opening of the container.

BRIEF DESCRIPTION OF DRAWINGS

FIG. 1 is an isometric view of a bubble generator.

FIG. 2 is an isometric view of an insert of the bubble generator housing of FIG. 1.

FIG. 3 is an exploded view of the bubble generator of FIG. 1.

FIG. 4A is a vertical cross-sectional FIG. 1.

FIG. 4B-FIG. 4D are views of FIG. 4 illustrating various phases of the operation of the bubble generator of FIG. 1.

FIG. 5 is a horizontal cross-sectional of FIG. 1.

FIG. 6 is an exploded view of an insert and cover for a bubble generator in one embodiment.

FIG. 7 is an exploded view of the insert and cover and container of the embodiment in FIG. 6.

FIG. 8 is an isometric view of the embodiment of FIG. 7 on a base.

FIG. 9A is an isometric view of a bubble generator with a center insert.

FIG. 9B is an isometric view of a bubble generator with a center insert positioned above the base.

FIG. 10A is an isometric view of the center insert of the bubble generator of FIG. 9A.

FIG. 11 is an isometric view of a bubble generator of another embodiment.

FIG. 12A is an isometric view of the insert of the bubble generator of FIG. 11.

FIG. 12B is a vertical cross-sectional view of the insert of FIG. 12A with a modified path member.

FIG. 13A-13E is a schematic view of the operation of the bubble generator of FIG. 11 and FIG. 12B.

FIG. 14 is a schematic view of the bubble generator of FIG. 11 and FIG. 12B raised from the base.

FIG. 15A-15E is a schematic view of the operation of the bubble generator of FIG. 11 and FIG. 12B with a solid particle clog.

FIG. 16A is a schematic view of the bubble generator of FIG. 15 with a skirt member.

FIG. 16B is a schematic view of a bubble generator system.

FIG. 16C is a top view of the bubble generator system of FIG. 16B.

FIG. 16D is a top view of the bubble generator system of FIG. 16B with a skirt.

FIGS. 16E-16G are top views of the bubble generator system with different skirt geometries.

FIG. 17A-17C are schematic views of the operation of the bubble generator of FIG. 11 and FIG. 12B with an exit riser extending above the top surface of the liquid.

FIG. 17D is a top view of the bubble generator of FIG. 17A.

FIG. 18A-FIG. 18E are schematic view of the operation of the bubble generator of FIG. 17A with additional gas input.

FIG. 18F is a top view of the bubble generator of FIG. 17A.

FIG. 19A-19C are schematic views of the operation of the bubble generator of FIGS. 11 and 12B with an exit riser and splitter.

FIG. 19D is a top view of the bubble generator of FIG. 19A.

FIG. 20A is an isometric view of the bubble generator of FIGS. 11 and 12B with an offset exit riser.

FIG. 20B is a partial exploded view of the offset riser and housing of FIG. 20A.

FIG. 20C is a top view of the bubble generator of FIG. 20A.

FIG. 21A-21C are schematic views of the offset riser of FIG. 20A extending above the liquid surface with the bubble generator of 19A.

FIG. 21D is a top view of the bubble generator of FIG. 21A.

FIG. 22A-FIG. 22B are schematic views of the operation of a bubble generator with an offset exit riser and splitter.

FIG. 22C is a top view of the bubble generator of FIG. 22A.

FIG. 23 depicts a schematic depiction of the fluid level of a bubble generator as demonstrated in FIG. 23A-23C.

FIG. 23A-23C are schematic views of the operation of a bubble generator with an exit riser having a lower free end that is lower than the bottom of the container.

FIG. 23D is a top view of the bubble generator of FIG. 23A.

FIG. 24A-FIG. 24C are schematic views of a bubble generator having an offset riser extending below the exit opening of the container with a splitter and splitter risers extending above the surface of the liquid with a skirt receiving gas from a small bubble discharge.

FIG. 24D is a top view of the bubble generator of FIG. 24A.

FIG. 25 depicts a schematic depiction of the fluid level of a bubble generator as demonstrated in FIG. 25A-25C.

FIG. 25A-25E are schematic views of a bubble generator moving within the liquid.

DETAILED DESCRIPTION OF THE INVENTION

Referring to FIG. 1 and FIG. 2 a bubble generator 110 includes a housing 112, an insert 114 and a cover 116. Housing 112 rests on a base 118. Housing 112 in one embodiment is a cylinder having an arcuate inner surface 120, an upper edge 122, an outer surface 124 and a bottom edge 126. In one embodiment the shape of housing 112 is non-cylindrical. In one embodiment, housing and cover are one piece, such as canister open on one end. Referring to FIG. 3 and FIG. 9C insert 114 is sealingly secured to a bottom surface 128 of cover 116, and sealingly secured to inner surface 120 of housing 112 to provide an air lift path 130 also referred to as gas path 130 referring to FIG. 4D as will be described herein below.

Referring to FIG. 2, insert 114 includes a first wall 132 having a top edge 134 including a first portion 136 and a second portion 138. Insert 114 includes a bottom edge 140 opposite top edge 134 and a first lateral edge 142 and an opposing lateral edge 144. In one embodiment lateral edges 142 and 144 are generally perpendicular to bottom edge 140 and generally perpendicular to first portion 136 of top edge 134.

Extending from first wall 132 is a first path member 146 and a second path member 148. First path member 146 includes an outer edge 150 and second path member 148 includes an outer edge 152. First path member includes a first terminal end 154; a first portion 156 extending from the first terminal end 154; a second terminal end 158; and a second portion 160 extending from the first portion 156 to the second terminal end 158. In one embodiment the distance that first path member extends from the first wall 132 varies from the first terminal end toward the second terminal end. The outer edge 152 fits against the inner surface 120 of housing 112. In one embodiment housing 120 is a cylinder having an arcuate shape. In one embodiment insert first wall 132 is planar and the first lateral edge 142 and second lateral edge 144 are operatively sealed to respective portions 162 and 164 of the inner surface 120 of housing 112. First wall 132 is positioned such that the plane defined by first wall 132 is a distance from the center line diameter 168 of the housing, where the center point of center line 168 is furthest from first wall 132. Stated another way the distance 170 between a longitudinal axis 171 of the housing and a line intermediate the first lateral edge 142 and the second lateral edge 144 is less than the radius of the cylindrical housing 112. The longitudinal axis of the housing extends generally perpendicular to a plane defined by an upper surface of cover 316 and extends generally perpendicular to an upper surface of base 118. The longitudinal axis of housing 112 extends through the center point of housing 112 that defines the point from which the radius of housing 112 begins. Where housing 112 is a cylinder the longitudinal axis of the housing is also referred as extending along the cylindrical axis.

Referring to FIG. 2 second path member 148 includes a first terminal end 172; a second opposing terminal end 174 a first portion 176 extending from the first terminal end 172, a second portion 178 extending from the first portion 176 and a third portion 180 extending between second portion 178 and second terminal end 174. First path member 146 includes a path surface 182 and an opposing surface 184. Second path member includes a path surface 186 and an opposing surface 188. In one embodiment an area 218 is defined by the planar region extending perpendicular between portion 160 of first path member 146 and portion 176 of second path member 148, the first wall 132 and the inner surface 120 of housing 112. In one embodiment area 218 is between 1.5 sq. in and 6 sq. in. In one embodiment the area 218 is between 3 sq. in and 4.5 sq. in. In one embodiment area 218 between 3 sq. in. and 10 sq. in. In one embodiment the area 218 is greater than 10 sq. in. In one embodiment the area is less than 1.5 sq. in. In one embodiment area 218 is substantially equivalent to the area 220 defined by opening 194 in a plane defined by the upper surface 190 of cover 116.

In one embodiment the area 218 is taken along a plane that is perpendicular to the direction of gravity when the bubble generator is in an in-use position. In one embodiment the area 218 is defined as a plane that is perpendicular to the local planes defined by first path member and second path member.

Referring to FIG. 3, cover 116 includes an upper surface 190 opposite lower surface 128. Cover 116 includes an opening 194 defined by a first portion 196 and a second portion 198. The lower surface 128 proximate first and second portions 196, 198 are sealed to first portion 136 of upper edge 134 of wall member 132 and second terminal end 174 of second path member 148. In this manner path 130 is in fluid communication with opening 194. Cover 116 and insert 114 are sealed together with a sealant such as a two-part epoxy or plastic solvent adhesive. However other sealants known in the art that provide a fluid seal between cover 116 and insert 114 may be used. The peripheral region of the lower surface 128 is sealed to the upper edge 122 of housing 112 and insert first edge 142 and second edge 144 are sealed to portions 162 and 164 of the housing inner surface 120.

Referring to FIG. 4A an air inlet 200 is operatively connected to a low-pressure air pump 210 to pump air or any gas into a cavity 192 of the bubble generator housing 112. The term air as used herein can refer to any gas or combination of gases. Low-pressure air is relative to the depth of the water, and the pressure must be at least slightly higher than the static water pressure at depth of the cavity. Cavity 192 is defined by the region between the inner surface 120 of the housing 112 and the lower surface 128 of cover 116. In one embodiment air inlet 200 includes a conduit 202 having an outlet portion 204 within the housing cavity. In one embodiment conduit 202 is operatively coupled to housing outer surface 124 and outlet portion 204 positioned proximate housing inner surface 120. In one embodiment conduit 202 extends through housing wall 206. In one embodiment (not shown) conduit 202 extends through cover 116. Housing wall 206 defines the outer surface 124 and inner surface 120.

Referring to FIG. 1 and FIG. 5, in one embodiment insert 114 is sized such that first insert wall 132 is positioned a distance 222 from the center of the cylinder where the distance extends from the center of the cylinder and intersects the insert first wall 132 at a point equidistant between the first lateral edge 142 and the second lateral edge 144. Further the distance between the first wall 132 of insert 114 from the center point line toward the outward lateral edge along a vector including the radius of housing 112 is equal to the radius of the housing cylinder—distance 222. In one embodiment the distance 224 of cover opening first portion 194 is 2 inches and the distance 226 of the cover opening second portion 196 is also 2 inches. In one embodiment the cylinder inner diameter is 8 and the distance 222 is 1.5 inches and the width 228 of wall 132 is 7.5 inches. However other dimensions less than and greater than those mentioned and different arrangements are also contemplated and is dependent and generally proportional to the size of housing 112.

Referring to FIG. 4A-4O fluid conduit 202 is in fluid communication between an inlet opening 208 of conduit 206 and the cavity 192. In one embodiment a lower portion of housing 112 is secured to a base 118 which may be concrete or other structure sufficient to maintain housing 112, insert 114 and cover 116 in an operative orientation. In operation housing 112, insert 114, and cover 116 are positioned within a body of liquid such as a wastewater treatment tank or a lake. While the term tank is used herein to describe the entity in which the liquid resides, the term tank should be understood to include any structure man-made or natural that holds liquid, such as the ground under and around liquid defining a lake or an open pit or region such as a reservoir. Liquid surrounds the outer surface 124 of housing 112 and the cover outer surface 116. The liquid rises above the upper surface of cover 116 such that air evacuated through opening 194 enters the portion of the liquid directly above the cover 116. It is contemplated that the liquid described herein as water or wastewater could be any liquid including but not limited to water. While wastewater is referred to herein, in one embodiment any liquid maybe substituted for the term wastewater.

Liquid enters cavity 192 through a fluid conduit 212 having an opening 214 within the wastewater pool and an outlet 216 within cavity 192. Referring to FIG. 4B air is pumped into cavity 192 with an air source such as air pump 210. Air pump 210 in one embodiment is a low-pressure air pump provides air between 3 and 15 psi at the air outlet 204. In one embodiment air pump provides air between 1 and 50 psi. However, the pressure of the air at outlet 204 must be greater than the static pressure of the liquid within the cavity. In one embodiment the pressure provided at the air pump outlet is greater than the static fluid pressure of the gas or liquid at the air pump outlet within cavity 192. In one embodiment the pressure provided by the air pump is at least one psi greater than the static pressure of the fluid at the air pump outlet. In one embodiment the pressure provided by the air pump is greater than the static pressure of the liquid at the air outlet but less than one psi greater than the static pressure of the liquid at the air pump outlet. In one embodiment the flowrate of gas is variable with respect to the frequency of large bubble events at a pressure higher than the static pressure of the liquid at the depth of the cavity. In one embodiment the air pressure at outlet 204 is sufficient to fill cavity 192 with a volume of air between 3 seconds and 3 hours to cause an intermittent bubble event as described herein. The term time for the bubble event is the time that passes between the gas beginning to be expelled from the container until the gas has been substantially expelled. Stated another way the time period for the bubble event is the time that passes between the accumulated gas in the container beginning to be expelled from the container through the opening until gas no longer travels through path 130. In one embodiment the bubble event is over once the region between the bottom most edge 172 and the bottom most upward facing surface of first path member 146 is refilled with liquid blocking the gas path. Referring to FIG. 4A when the vertical distance 220 between edge 172 of second path member 146 and second path member 148 is filled with liquid immediately following the discharge of the volume of gas. The duration of the large bubble gas event is significantly less than the time for gas to accumulate in the container, the duration of which a majority of the accumulated gas exits the container occurring over a short period of time. In one embodiment, the large bubble event lasts less than 3 seconds. In another embodiment the large bubble event lasts less than 5 seconds. This period is referred to herein as time for each large bubble event. The period between the large bubble events is referred to as the gas accumulation period. In one embodiment a large bubble event includes at least one bubble having a width of at least six inches. In one embodiment a large bubble event includes at least one bubble having a width greater than 2 inches. In one embodiment a large bubble event includes at least one bubble having a volume greater than eight cubic inches. The description of the time and size of large bubble event in this paragraph is applicable to all of the bubble generator systems discussed herein.

The term liquid as used in this paragraph refers to the liquid within the tank outside of the air outlet and not the air itself. For example, when the bubble generator is in a wastewater pool, the liquid is the wastewater. In one embodiment the time interval in between bubbles depends on the rate in which gas is added. In one embodiment the range between bubble events are 0.025 bursts per minute (BPM) and 15 bursts per minute. In one embodiment, a large bubble event may not occur in over a day due to variable pumping flow when the low-pressure air pump or compressor is powered by, but not limited to, solar or wind generated power. In one embodiment air is provided continuously, and the rate of air being pumped into the container cavity is constant, however the frequency of bubble events is determined by the volume of the tank cavity and geometry of the insert.

Referring to FIG. 4C once the air level in cavity 192 has a bottom portion that clears the first terminal end 172 of second path member 148 the air within the cavity 192 is forced through path 130 and exits housing 112 through opening 194 in a large intermittent bubble event. Wastewater then refills cavity 192 as the air bubble is evacuated and the process repeats itself as air may be pumped continuously from air pump 210.

Referring to FIGS. 6-8 in one embodiment a bubble generator insert 314 includes an insert first wall 332. In one embodiment insert first wall 332 is planar. In one embodiment insert first wall 332 is non-planar. A second wall 334 is connected to first wall 332 along corresponding peripheral edges 340, 342. First path member 336 and second path member 338 extend between first wall 332 and second wall 334. In one embodiment second wall 334 is arcuate and has an arcuate shape that allows it to closely fit against an inner surface of arcuate housing 312. An upper edge 344 of second wall 334 is sealed to an underside of cover 316. Portion 348 of first wall 332 and terminal edge 350 of second path member 338 are also sealed to the underside of cover 316.

In one embodiment upper surface or end 344 of second wall 334 is secured to the underside of cover 316 a sufficient distance from the outer circumference of cover 316 such that cover 316 may be sealingly secured to the upper edge 354 of container 312. In one embodiment insert 312 is a stand-alone product and provided to an end user who would then secure insert 314 to cover 316 prior to securing the assembly to container 312. In one embodiment insert 314 and cover 316 form a single unit that is provided to a user who then inserts insert 314 within housing 312 and sealingly secures cover 316 to container 312. The term sealingly secured refers to a seal that does not allow fluid to pass therethrough. Referring to FIG. 8 a bubble generator 300 includes container 312 with insert 314 and cover 316 sealingly secured thereto. An air inlet 356 and liquid inlet 358 are secured to container 312 to provide air within the cavity of the container as discussed above with respect to bubble generator 110 to provide intermittent large bubble events. In one embodiment there is no floor between a lower edge 360 of first wall 332 and a lower edge 364 of second wall 334. In one embodiment a floor 364 is provided between lower edge 360 of first wall 332 and a lower edge 364 of second wall 334.

The term "bubble generator" as used herein may also be referred to as an airlift pump. The embodiments as described herein may be used in combination with water aeration systems that provide water mixing where the bubble generator or airlift pump provides for accumulating and releasing air and gas within and beneath the surface of liquids in a large bubble event.

Referring to FIGS. 9A and 10A a bubble generator 400 includes an insert 410 that is centrally received within a housing 412. A cover 414 covers insert 410 and the cavity defined by the inner surface of housing 412. Insert 410 includes a first wall member 418 and a second wall 420 offset from first wall member 418. A first path member 422 and a second path member 424 extend between first wall member 418 and second wall member 420.

Insert 410 is sealingly secured within container 412 by sealing lateral edges of first wall 418 and second wall 120 to the inner surface of container 412. Cover 414 is sealing engaged to upper terminal ends 426, 428 of first and second path members and to the upper edge 430 of container 412. Once assembled an air bubble outlet opening 432 extends through cover 414 and is in fluid communication with the flow path 436. Liquid enters the cavity through opening 434 in cover 414. Air is pumped into the cavity through a gas inlet (not shown) with a low-pressure air pump until the air within the cavity extends from the underside of cover 414 (that is the surface of the cover facing into the container) to the bottom terminal end 440 of second path member 424 at which point the intermittent bubble event occurs with the air being substantially evacuated in a large bubble event through opening 432. Liquid in the cavity is also evacuated through opening 432 via path 438. In one embodiment first wall 418 and second wall 420 have lower edges 419 and 421 respectively that are spaced from the bottom 413 of container 412. In one embodiment lower edges 419 and 421 are positioned between a bottom most portion 423 of first member 422 The operation of bubble generator 400 is similar to the operation of bubble generator 110 described herein above. In one embodiment gas accumulated within the cavity of the container will first aggregate immediately adjacent the top wall or cover as the gas has less density than the density of the liquid within the container. As gas continues to accumulate within the container the lowermost level of gas will in a direction toward the bottom of the container. The operation of bubble generator 400 is similar to the operation of bubble generator 110 described herein above. In one embodiment gas accumulated within the cavity of the container will first aggregate immediately adjacent the top wall or cover as the gas has less density than the density of the liquid within the container. As gas continues to accumulate within the container the lowermost level of gas will in a direction toward the bottom of the container.

Referring to FIG. 9B a bubble generator 401 is similar in all respects to bubble generator 400 except as described in this paragraph. In this embodiment the bottom edges 419 and 421 of first wall 418 and second wall 420 are spaced from the bottom edge 413 of container 412 and above the top surface of base 416.

Referring to FIGS. 11, and 12A a bubble generator 610 includes an insert 612 within a container 614 supported by a base 616. A cover 618 is secured to an upper edge 620 of container 614. Insert 612 includes a first wall 622 and an opposing second wall 624. A first path member 626 and a second path member 628 form a path 630. First path member and second path member extend between first wall 622 and second wall 624. First wall 622 and second wall 624 include an upper edge 632 and 634 respectively. Upper edge 632 and 634 have a first region 636 and 638 respectively that are spaced from a bottom surface 640 of cover 618 a predetermined distance 642. Upper edges 632 and 634 of first wall 622 and second wall 624 have a second region 644 and 646 respectively that contact the underside or bottom surface 640 of cover 618. First wall 622 and second wall 624 have a lateral edge 648 and 650 respectively.

In one embodiment lateral edges 648 and 650 are secured to an inner wall surface of container 614, and upper edge surfaces 644 and 646 are secured sealingly to the bottom surface of cover 618. In one embodiment container 614 includes an aperture 652 extending therethrough at a location between a lower edge 654 of container 614 and a lower edges 656 and 658 of first wall 622 and second wall 624 respectively. In one embodiment an upper region 653 of aperture 652 is also located between a lowermost bottom point 660 of first path member 626. Referring to FIG. 11 cover 618 includes an opening 662 that fits up to or within the profile defined upper edge portions 644, 646 and of inner surface of container 614 immediately adjacent upper edge 620 of container 614. Referring to FIG. 12A a free end 664 of second path member 626 and a free end 666 of first path member 626 has a radius of at least 0.125 inches. In one embodiment the radius of free end 664 and free end 666 is at least 0.25 inches. In one embodiment the radius of free end 664 is greater than the thickness of second path member 628. In one embodiment lateral edges 638, 636, 656, and 658 has a radius of at least 0.125 inches. In one embodiment the radius of lateral edges 638, 636, 656, and 658 is at least 0.25 inches. In one embodiment the radius of free end 664 is greater than the thickness of second path member 628. Referring to FIG. 12B insert 613 is similar to insert 612 except that second path member 629 has a generally concave orientation whereas second path member 628 of insert 612 has both a concave up portion and a concave down portion. The point or line of inflection of second path member 628 of insert 612 is the point at which second path member goes from being concave up to concave down. Second path member 629 does not have any point of inflection since second path member is only concave up. In one embodiment second path member 629 has no curvature but straight or flat and is bent or angled at a point above terminal point 666 such that it forms a length that is parallel with the first path member 626 for the majority of the remaining length to terminal edge 664. First path member 626 has a curved portion 627 in a region generally below terminal edge 664 of second path member 629. A trap is defined as the region between the terminal edge 664 of the second path member and the curved portion 627 of the first path member at or below the terminal edge 664. Curved portion 627 extends from a region above terminal edge 664 on one side of the second path member to a region above terminal edge 664 on the opposing side of the second path member.

Referring to FIG. 13A-13E bubble generator 610 is located within a body of liquid such as wastewater. Generally, bubble generator 610 is located in liquid at a depth of 2 feet of water to 25 feet of water. In one embodiment bubble generator 610 is located in liquid greater than 25 feet of liquid. Air is introduced into container 614 with a conduit 670 secured to a gas pump 672. In one embodiment pump 672 pumps air. Air is introduced into a cavity 674 defined by the interior wall of container 614 and the cover 618. In one embodiment container 614 is a cylinder having a single arcuate wall. In other embodiments, the cavity may be rectangular or semi-spherical. However other geometric configuration of container 614 are contemplated. Cavity 674 is defined as the region between the inner surface of the walls (singled wall for a cylinder) of container 614 and cover 618. Referring to FIG. 13B the gas accumulates from a region immediately adjacent the bottom surface of the cover toward the bottom of the container, when bubble generator 610 is positioned in an in-use orientation where the direction from the bottom 654 of container 614 toward cover 618 is opposite the direction of gravity. The fluid in the cavity is forced out through either an open bottom of container 614, or through a bottom aperture 652 and opening 662 in cover 618. Fluid inside the insert cavity is forced out through the gas path either through the exit or fluid path. The insert cavity is the region within the insert above the trap. Referring to FIG. 13C once the bottom level 676 of the gas reaches the bottom of the terminal free end 664 of second path member 628 an intermittent large bubble event occurs as the gas flows along a path 678 and escapes container 614 through opening 662. As the gas exits opening 662 liquid surrounding container 614 enters the open bottom of container 614 or through opening 652 and assists in pushing gas within cavity 674 into insert 612 via a path 684 through the space defined between upper edges 636, 638 and cover 618. In one embodiment it is believed that this process causes a cascading effect. As the gas begins to flow over terminal edge 664 the pressure drops in at the trap location. The drop in pressure simultaneously allows water to start rising in the cavity (which is at a static pressure) and accelerates toward the top of the cover which forces more gas to be pushed out the gas path. The gas rising through the gas path 130 expands to the outer walls forming a gas siphon and prevents water from refilling the gas path. The gas stream flows past terminal edge 666 where the gas meets the liquid path 678 in the discharge path 679, forming an airlift pump, drawing liquid up with the gas through the liquid path 678 and out the exit 662. The rapid movement of the gas forcing down on the arcuate path member 627 during this process allows for any settled material in the trap to be forced out the gas path to the discharge path, similar to a toilet flush. After a majority of the gas is released and equilibrium in pressure is attained, liquid is able to refill the trap, blocking the gas path, and the liquid level in the container and cavity 684 of insert equalizes towards the top of the container and the accumulation period starts over. Referring to FIG. 13D liquid within the cavity 674 also exits opening 662 via a portion 680 of path 678. The large bubble event results in a bubble 682 being expelled from opening 662 in a short period of time. As large bubble region 682 rises from container 614 liquid surrounding opening 662 along with liquid entering the cavity from opening 652 fills path 678. A small amount of gas will remain in container 614 and referring to FIG. 13E the process described herein will repeat itself until pump 672 no longer pumps gas into cavity 674. In one embodiment the amount of gas remaining in container 614 immediately after the large bubble event is less than 10% of the gas in the cavity immediately prior to the initiation of the large bubble event. In one embodiment the amount of gas remaining in container 614 immediately after the large bubble event is less than 25% of the gas in the cavity immediately prior to the initiation of the large bubble event.

Referring to FIG. 14 container 614 can be supported on a base 616 via at least one bracket 685 such that the bottom of container 614 is elevated from base 616. Referring to FIG. 14 conduit 670 through which a gas from a pump 672 travels is in fluid communication with container 614 via an opening in the side wall of container 614. In another embodiment conduit 670 is in fluid communication through an open bottom of container 614. In one embodiment conduit 670 enters container 614 closer to cover 618 than to base 616. In one embodiment conduit 670 enters cover 618 through a sealed opening in cover 618. In one embodiment multiple conduits 670 from a single pump gas 672 is in fluid communication container from one or all of the entry points noted above. The term fluid communication is used herein to describe the condition in which gas and/or liquid can move from one place to another. Referring to FIG. 14 gas pumped from pump 672 flows through one or more conduits and enters container by being in fluid communication via a sidewall and/or bottom and/or top cover.

Referring to FIG. 15A-15E in one embodiment solids within the liquid in which container 614 is submerged may include solid particles 686 which act to clog path 678. In this clogged situation the gas accumulated within cavity 674 will not be able to escape through path 678 once the bottom of the gas falls below the terminal free end 664 of second path member 626. Rather gas will continue to accumulate until the bottom of the gas falls below one or both of lower edges 656, 658 at which point the accumulated gas will rise through portion 680 of path 678 as small bubbles. If the gas flow is great enough, the bubbles flowing through 678 and past terminal edge 666 and the gas path 130, can cause a venturi effect which will act to reduce the pressure in the gas path. The addition of more pressure from the gas being filled past the lower edge of 658 and 656 and the reduced pressure from the venturi effect past the gas path (increasing differential pressure with respect to the two sides of the trap section is believed to allow the clog to be forced through the gas path, up and out the discharge path 679. This feature is believed to allow the bubble generator be automatically self-cleaning or clog fixing. Referring to FIG. 15D a user either seeing or via an automatic sensor detecting small bubbles rising from bubble generator 610 will cause the operator or a controller to increase the flow rate of gas into container 614. A combination of an increased venturi effect further increasing differential pressure and and/or a turbulence effect of the increased flow rate and rising air in portion 680 will act to free solid particles 686 from path 678 in most cases without manual maintenance.

In one embodiment a system receives a controller receives a signal from a sensor 691 indicating the presence of a large bubble event. The controller or PLC 693 after not receiving a signal indicating a large bubble event after a predetermined time automatically increases the flow rate of gas into container 614 until a large bubble event is identified. In one embodiment the controller sends an alarm to an operator. In one embodiment, the sensor uses a switch to sense a large bubble. In one embodiment a mechanical switch is activated when gas passes proximate the exit or within a path of the container during a large bubble event. In one embodiment the sensor uses a capacitive sensor to sense a large bubble. The capacitive sensor measures the level of water within the cavity that changes during a large bubble event. In one embodiment the sensor uses a pressure sensor to sense the release of a large bubble. In one embodiment the pressure sensor senses a change in pressure within the cavity that occurs during a large bubble event. In one embodiment an accelerometer sensor detects the motion of water proximal to the large bubble. In one embodiment the controller counts the number of large bubble releases in time with a signal from a sensor measuring the presence of a large bubble. In one embodiment the controller receiving a signal from the sensor automatically opens and closes a mechanical valve 695 depending on the number of bubble events in a predetermined amount of time. In one embodiment the controller receiving a signal from the large bubble detecting sensor increases or decreases the gas flowrate provided by the gas source. It is contemplated that other sensors known in the art that detects a change in pressure, water movement, or presence of a bubble may be used. In one embodiment a controller sends a signal to a relay to change a state of operation of one of a gas pump, mechanical valve and motor.

Referring to FIG. 16A a passive pulsed air mixer 700 includes a bubble generator 610 (also referred to herein as a pulsed air mixer) described herein placed over an aerator system 702 that generates small bubbles. Aerator system 702 includes a pump (not shown) pumping gas through a conduit 704 in fluid communication with a plurality of aerators 706. Each aerator has an aeration disc with a plurality of small holes or a membrane through which air exits. A skirt member 708 extends radially outwardly from an outer wall of the container of bubble generator 610 to capture small bubbles released from the aerators 706 into the cavity of the container through an open bottom of the container. Other bubble generators described herein or other pulsed air mixer designs known in the market that provide intermittent pulsed air bubbles in large bubble events may also be used with a skirt member 708. For example, the pulsed air mixer described in US patent application publication No 2014/0246105 as well as other pulsed air devices known in the art may be used. Aerator system 702 is a separate, often preexisting, passive system in which air is released through the small holes in discs 706 or other aeration devices known in the art such as tubular membrane aerators (not shown) that are in fluid communication with conduit 704. By selectively positioning bubble generator 610 over aerators 706 with or without the addition of a skirt mechanism 708, for bubble system 700 or 701, an approximate flowrate of small bubbles entering the cavity of container 614 can be chosen. Thusly an approximate accumulation period between large bubble events can be chosen in such the volume of the bubble generator and the aerator flowrate allowing this calculation. The gas from the small bubbles entering from the aerator system will accumulate until the bottom level of gas is below terminal edge 664 of bubble insert 613 in bubble generator 610. At this point, as discussed above, a large bubble event occurs in which the majority of the accumulated air is released through an exit of the container via pathway 130 and 679. The size of skirt 708 may be selected to cover the selected number or portion of discs 706 so that the rate of gas entering cavity 674 can be approximated. In one embodiment skirt 708 includes an angled portion directing bubbles from a region radially outward of container 614 to a region radially inward of the outer wall of container 614 such that the bubbles can enter cavity 674 of container 614. In one embodiment skirt 708 covers at least a portion of one aerator disc. In one embodiment the skirt 708 is only slightly angled as to allow flow of small bubbles to the bubble generator. The term aerator disc as used herein refers to both a circular member having a plurality of holes as well as any shape member having a holes allowing gas to escape therefrom, and may be either fine or coarse bubbles as is known in the art. In one embodiment the lower edge of cavity 674 is spaced above the holes of the aerator discs such that the gas rising within the surrounding liquid enters into cavity 674 without the assistance of any pump once the gas exits the aerator discs. Referring to FIG. 16A container 614 is positioned above conduit 704 and aerator discs 706 by at least one bracket 685. In one embodiment container 614 is supported by three brackets 685 and in one embodiment container 614 is supported by four or more brackets. In one embodiment brackets 685 have adjustable member to raise or lower the container from the bottom portion of the bracket to adjust for conduit 704 and/or aerator height. Referring to FIG. 16F, FIG. 16G and FIG. 16H, skirt 708 may have a periphery that is generally circular, rectangular or oval respectively depending on the location and spacing of the aerator disc layout.

Referring to FIG. 16B a bubble generator system 701 includes bubble generator 610 is supported with a riser 712 extending from container 614 to a base portion 710 which is located on the bottom of the liquid tank. In one embodiment base portion 710 is anchored to the tank with a mechanical fastener. In one embodiment base portion 710 includes ballast such as concrete or other non-corroding material having sufficient weight to maintain passive pulsed air mixer (bubble generator) 610 in a fixed position relative to the bottom of the tank when pulsed air mixer 610 has the maximum volume of air in the pulsed air cycle. A riser member portion 712 extends from base portion 710 and support pulsed air mixer 610 a distance above base portion 710. The distance between base portion 710 and pulsed air mixer 610 is sufficient to allow an air header (aerator disc) 706 to fit there between. In one embodiment riser 712 is positioned proximate one side of base 710 such that base 710 can be slid underneath aerator discs 706 and/or conduit 704 allowing the gas being released from the aerator discs 706 to enter cavity 674 of container 614 through an opening in the bottom of container 614.

Air header 706 introduces air from a low-pressure blower into the region between base portion 710 and pulsed air mixer 610. Air released from air header 706 is received within pulsed air mixer 610. Air accumulates within pulsed air mixer 610 from air head 706 until the air reaches the critical level and a large bubble event occurs by releasing the majority of the gas in a large bubble event as described herein above. The system passive pulsed air mixer 610 is defined as passive because no air is directly connected to the pulsed air mixer 610, rather pulsed air mixer 610 passively receives air directly from one or more aerator discs or airhead 706. In one embodiment airhead 706 may be part of an existing wastewater treatment system providing fine or coarse bubbles. Passive pulsed air mixer 610 may be place over or adjacent to the airheads 706 such that the fine or coarse bubbles released form the airhead 706 are received within pulsed air mixer 610. The mixing from these passive mixers is to augment the mixing of the tanks such that the volume of air required by the aeration gallery may be lowered. In many cases, such as with WI DNR (Wisconsin Department of Natural Resources) for example, horsepower requirements are mandated in design such as to keep solids in suspension, even if the bacteria does not require as much oxygen—the passive mixers put in place may allow operators to reduce the amount of air into a bank of aeration headers to reduce overall electricity usage (blower) while sustaining adequate mixing. It is also believed that the mixing effect and currents induced by large bubbles rising in the column of water can aid in the efficiency of oxygen transfer of such systems by both moving large volumes of water and by inducing convective-like currents in wastewater treatment basins or tanks. It is also believed that large bubbles in wastewater treatment basins can induce the formation of larger, faster settling bacterial flocs as they are known in the art.

In one embodiment a skirt member 708 may added to a bottom portion of pulsed air mixer 610 that extends radially outwardly from the outer housing 614 of pulsed air mixer 610 to assist in capturing additional air from airhead 706 as described above in combination with the offset riser 712 and base 710 that slides under aerator discs 706. Note the terms aerator discs and airheads are used interchangeably.

In one embodiment, riser 712 can be separate from the pulsed air mixer 610 and made out of a separate material and fastened into place to container 614. In one embodiment, the riser may be cut out of the same material as the mixer body or container 614 such as a PVC pipe where the PVC pipe is sufficiently rigid to sustain repeated bursts and is non corrosive. In this embodiment, the pipe may be cut 50% to 80% proximate the bottom of container 614 such that the riser is formed from part of the container. In one embodiment riser 712 may be 2 or three separate portions extending from container such that the container may straddle conduit 704 and aerator discs 706. The riser portions may be either fastened to the ground or set in concrete as ballast such that it may be set in place. In one embodiment ballast is secured to riser portions to maintain bubble generator 610 in a defined location relative to the liquid tank floor of the liquid tank in which bubble generator is positioned.

The embodiments disclosed in FIGS. 16A and 168 include bubble generator 610 that may or may not be positioned on the floor of the liquid tank. Bubble generator 610 bursts a large bubble intermittently after being filled past a predetermined level in cavity 674 defined by the path defined by the geometry of the bubble generator insert. Referring to FIG. 16A and FIG. 168 the embodiments disclosed require no external source of gas or air, rather bubble generator 610 is mounted over the top of existing aeration devices. In one embodiment skirt 708 is added close to the bottom of the bubble generator 610 which is designed to collect more gas or air from adjacent aerator devices/headers. The frequency of large bubble generation is determined by the rate which the aerators release air or gas, the number of aeration headers being collected from and the volume of the bubble generator 610.

Referring to FIG. 17A-17D a bubble generator system 720 includes a bubble generator 610 as described herein that may be positioned proximate the floor of the liquid tank in which bubble generator 610 is positioned. In one embodiment bubble generator 610 is positioned intermediate a base of the liquid tank in which it is submerged and an upper level 722 of the liquid in the liquid tank. An exit conduit 724 is in fluid communication with exit opening in cover 618 and has a free end extending above the upper level 722 of liquid in the tank. Stated another way the upper level 722 of liquid in the tank in which bubble generator 610 is submerged is intermediate the upper free end of conduit 720 and bubble generator 610. During a large bubble event the large bubble or gas escaping through the exit aperture of cover 618 or container 614 enters conduit 724 and is directed upward and outward of the exit 726 at the upper free end 728. Liquid that was present in conduit 724 prior to the large bubble event is pumped outward through exit 726 via a gas piston effect as the bubble rises through the conduit. Accordingly, bubble generator system 720 pumps liquid 730 above the liquid level 722. This event also draws liquid into the conduit through liquid path 678. The vacuum formed after the large bubble forces water of conduit 724, refills the conduit 732 to liquid level 722 after the large bubble event. Liquid path 678 is defined as the region between first and second path members and the surface of the inner container wall and is referred to herein as the liquid or fluid path. In one embodiment liquid path 678 may be defined solely by the insert geometry.

Referring to FIG. 18A-18F a bubble generator system 740 includes a bubble generator 610 positioned below an upper level of liquid within a liquid tank in which bubble generator 610 is positioned. A gas pump 672 positioned outside of the liquid tank pumps gas through a conduit 670 having a main branch 744 extending directly from gas pump 672 and a second branch 746 in fluid communication with main branch 744. Main branch of conduit 670 is in fluid communication with cavity 674 of container 614 such that gas entering into cavity 674 accumulates within cavity 674 until a large bubble event. Second branch 746 is in fluid communication with container 614 proximate liquid path 678 discussed above. Gas merging with liquid path 678 via gas path 130, rises through path discharge path 679 and exits container 614 via the exit opening in cover path or container 614 proximate cover 618 and enters conduit 748. The continuous flow of gas bubbles entering liquid path 678, which is situated behind the outer wall of bubble generator 610, subsequently rise through conduit 748 acts to maintain any solids in suspension within the liquid in conduit 748 between large bubble events. Maintaining solids in suspension in the liquid within conduit 748 increases the size and density of solid particles that flow with the liquid out free exit of the conduit during the large bubble event. Bubble generator 610 of bubble generator system 740 in one embodiment is located proximate the bottom of the liquid tank and in one embodiment bubble generator 610 is located intermediate the upper liquid level 722 and the bottom of the liquid tank. In one embodiment the bottom of the bubble generator 610 is located above the bottom of the tank at least 25% of the distance from bottom of the tank to the upper liquid level. In one embodiment the bottom of the bubble generator 610 is located above the bottom of the tank between 10% and 70% of the distance from the bottom of the tank to the upper liquid level. In one embodiment the terminal free bottom edge of the second path member must be below the upper surface of the liquid level. In one embodiment the exit through which the gas exits the container during a large bubble event is below the upper liquid level of the tank in which the container is located. The term "tank" as used herein refers to any body of water manmade or natural.

Referring to FIGS. 18A-18E bubble generator system 740 bursts a large bubble through conduit 748 and pumps liquid via a gas piston action that is released by bubble generator 610. Additional gas line 746 provides gas such as air into the lower portion of the liquid channel 678 formed by the insert alone or in combination with the container wall. When the large bubble bursting condition initiates liquid rises from the top of the bubble generator exit into conduit 748 causing liquid to be pumped via a gas piston action. The subsequent vacuum caused by the evacuation of liquid draws in liquid with or without solids into the conduit through the liquid channel 678. The second gas conduit 746 continuously provides bubbles of gas into the conduit both before, during and after the large bubble event keeping solid particles that would otherwise settle suspended in the liquid. The solid particles remain suspended in the conduit 748 until the next large bubble burst event initiates, causing the majority of the volume of the liquid and solids in conduit 748 to be evacuated in the subsequent burst (release of the majority of the volume of accumulated gas in the cavity). In one embodiment valves may be manually or electronically controlled via a controller to throttle the volume of air from the main branch 744 and second branch 746.

Referring to FIG. 19A-19D a bubble generator system 760 includes a bubble generator 610 positioned below an upper level 742 of liquid within a liquid tank in which bubble generator 610 is positioned. As discussed above, bubble generator may be positioned adjacent the floor of the liquid tank or between the floor of the liquid tank in which it is positioned and the upper level 762 of the liquid in the liquid tank. A conduit system 764 includes a first conduit arm 766 and a second conduit arm in fluid communication with a splitter 770 that is secured to and in fluid communication with the exit through cover 618 or container 614. Bubble generator system 760 both bursts a large bubble during a large bubble event through the exits 772 and 774 of the conduit system and pumps liquid via a gas piston action that is released by bubble generator 610. When the bubble bursting condition initiates, liquid rises from the top of the bubble generator exit into the conduit system, the liquid and subsequent gas in the large bubble event is split via splitter 770 into first conduit portion 766 and second conduit portion 768. The split liquid and gas exits via exit openings 772 and 774. Where exits 772 and 774 are positioned below the upper liquid level 762 the liquid within the conduit system 760 and gas from the large bubble event are both expelled into the liquid in the tank. In one embodiment the liquid and gas are expelled into the tank above the container 614 of bubble generator 610. As the liquid is expelled upward and outward of conduit system 774 a vacuum is created within the split conduit system 764 and causing liquid to be drawn from within container 614 through liquid path 678 to also be expelled from container 614 through conduit system 760 during the subsequent large bubble event. In one embodiment, the path of splitter 768 and or 766 may be split multiple times in similar fashion.

Referring to FIG. 20A-20C a bubble generator system 800 includes a bubble generator 610 and an offset exit conduit 802 having a first conduit portion 804 having a cross sectional area that is greater than the cross-sectional area of the exit opening 662 of cover 618. First conduit portion 804 has a bottom segment that is located adjacent a top of cover 618 such that exit opening of cover 618 is completely within the cross-sectional area of the first conduit portion 804. Offset exit conduit 802 includes a second portion 806 extending downward from first portion 804 having a cut-out region 808 forming a first longitudinal edge 810 and a second longitudinal edge 812. In one embodiment first longitudinal edge 810 and second longitudinal edge 812 are positioned adjacent the outer wall of container 614. In one embodiment first longitudinal edge 810 and second longitudinal edge 812 are sealed to the outer wall of container 614. The second region 808 of offset conduit 802 has a bottom free end with an opening 816. First portion 804 in has a circular cross section with a longitudinal axis 818 extending through a center of the circular cross section. Longitudinal axis 818 is parallel to and spaced from a longitudinal axis extending from opening 661 that is extends through a center point of opening 661. In this manner the conduit 802 is offset from opening 662. In one embodiment the area of segment upper segment 804 is at least 50% larger than lower segment 806. In one embodiment the area of upper segment 804 is at least 75% larger than lower segment 806.

Referring to FIG. 21A-21C a bubble generator system 820 is similar to bubble generator 720 with exit conduit 730 replaced with offset conduit 802. As with other bubble generator systems described herein bubble generator system 820 may be located proximate the floor of the liquid tank in which bubble generator 610 is positioned (submerged in the liquid within the liquid tank). In one embodiment bubble generator 610 is positioned intermediate a base of the liquid tank in which it is submerged and an upper level 822 of the liquid in the liquid tank. As gas accumulates within cavity 674 of container 614 offset conduit 802 is filled with liquid alone or with solid particles from the bottom open end to the upper liquid level 822. When the large bubble event is initiated, gas exits opening 662 and enters the first portion 804 of offset conduit 802 forcing liquid in the first portion 804 and above offset conduit up and out of an exit 824 via gas piston which may be above liquid level 822 or below liquid level 822. Liquid within the conduit is expelled through exit 662 via liquid path 678. Simultaneously, the vacuum created by evacuation of liquid from conduit 802, liquid is drawn both through the liquid path 678 and through exit 662 and liquid is drawn through opening 816 through the lower portion 806 of offset conduit 802 and is also drawn upward through conduit 802 replacing liquid evacuated from the conduit exit 824. The liquid settles back to liquid level 822 between large bubble events. In one embodiment liquid enters the open end 816 from the tank replacing the liquid being expelled upward into first portion 804.

Referring to FIG. 21A-21C conduit 802 is larger than the bubble generator 610 exit 662. In one embodiment first section 804 of conduit 802 is defined as the portion above the opening 662 and second section 804 of conduit 802 is defined as the portion below the opening 662. Bubble generator 610 pumps liquid intermittently a majority of the volume above the bubble generator acts as a piston of gas pushes a majority of the liquid through conduit section 804. The resulting vacuum created by the evacuation of gas and liquid during the large bubble event from the top of the conduit draws liquid both from the container 614 and the second portion or lower segment 804 of conduit 802 from at or below the bubble generator exit 662 allowing a large volume of liquid to be replaced in the conduit from the liquid tank from closer to the bottom of the tank. This is in contrast to liquid entering the container or conduit from a position closer to the upper liquid level and further from the bottom of the tank. The vacuum discussed herein acts in the same manner as a siphon.

Referring to FIGS. 22A and 22B a bubble generator system 840 is similar to bubble generator 760 (FIGS. 19A-19C) and bubble generator system 820 (FIG. 21A-21C) with exit conduit 764 replaced with a split offset conduit 842 that is the size of offset conduit 802. Split offset conduit system 842 includes a first portion 844 that is the same as offset conduit 802 having a first section 845 and a second section 846 as described above. First offset conduit section 845 is in fluid communication with a first branch 848 and a second branch 850 via a slitter 852 which in one embodiment is a Tee-connector. Gas such as air is pumped from a gas pump outside of the liquid tank into cavity 674 of container 614 via a conduit 670 once the gas in the cavity reaches the critical level a large bubble event initiates in which the majority of gas is expelled through exit 662 of cover 618 and/or container 614. The rising gas acts to force the liquid within first section 845, splitter 852 and branches 848 and 850 to be expelled via terminal free end exits of the first and second branches respectively. The resultant movement of the gas and liquid causes a vacuum and a siphon that draws liquid from both the liquid path 678 of the container and the second portion of 846 of offset conduit 842. First section 844 and second section 846 have the same geometry as the first section 804 and second section 806 of offset conduit 802 described above. In one embodiment splitter 852 may direct gas and liquid into more than two branches. In one embodiment branch 848 and/or branch 850 may include a further splitter distal splitter 852.

Referring to FIG. 23A-23C a bubble generator system 880 includes a bubble generator 610 as described herein above with a conduit system 882 extending from exit 662. Conduit system 882 includes a first section 884 in fluid communication with and extending from opening 662 to a position extending radially beyond the outer periphery of container 614. A second conduit section 888 is in fluid communication with first section 884 and includes an upper portion 890 extending in an upward direction toward the upper liquid level or top of liquid tank. A lower portion 892 extends downwardly from the height from the bottom of the tank defined by exit 662 away from upper portion 890 and first section 884. Unlike the offset conduit 802 conduit sections 884, 890 and 892 are respectively at a constant diameter without any segment break. In one embodiment the respective diameters are different from one another. In one embodiment the diameter of the first section is different from the diameter of the upper portion 892 and lower portion 884. In one embodiment, the conduit is attached to bubble generator as 802, but is sealed around the lower portion where of the bubble generator such as to make a single conduit with attached generator. Similar to other embodiments bubble generator 610 need not be proximate the bottom of the liquid tank but may be intermediate the bottom of the liquid tank and the upper edge of the tank and below the upper liquid level within the tank. The lower free end of the lower section 892 may be lower than the bottom of container 614 or may be intermediate the bottom of container 614 and the exit 662. Upon initiation of a large bubble even once the accumulated gas with in the cavity reaches the critical point as discussed above, gas is expelled through exit 662 and into section 884 and into upper section 890. The gas being expelled during the large bubble event acts to pump liquid via gas piston within section 884 and upper section 890 up and out of exit opening 894 of upper section 890 either directly or via an exit extension 895. Simultaneously as liquid is expelled, the resulting vacuum draws liquid via the liquid path 678 upward toward and through exit 662 and liquid within lower section 892 upward toward and into upper section 890. Depending on the vacuum caused, liquid from the liquid path and within lower section 892 is expelled through exit 894 either above upper liquid level 896 or below liquid level 896 if exit 894 is positioned below the upper liquid level. As noted above the lower free end exit 898 in one embodiment is located below the bottom of bubble generator 610 to more effectively draw liquid from lower than the depth of the bubble generator 610 and draw through conduit 890, and eventually expel it through exit 894 as a result of combination of gas piston and vacuum that intermittently occurs during each large bubble event. This orientation allows pumping liquid from a greater depth of the tank without increasing pressure required to pump air to the bubble generator as the bubble generator need not be at the same depth as the liquid being pumped.

Referring to FIG. 24A-24D a bubble generator system 900 is similar to bubble generator system 840 (FIG. 22A-22B) having an offset conduit and split conduit which may be split in more than two directions, and risers 902 and 904 which raise the conduit up out or under of the liquid level 722 similar to generator system 820 (FIG. 21A-C) with the addition of the skirt feature of bubble generator system (FIG. 16A) that passively diverts gas from an aerator below the bottom of container 614 into cavity 674. Bubble generator system 900 includes many features described herein combined in a single system. Bubble generator system 900 includes insert 613 illustrated in FIG. 12B. Bubble generator system 900 includes an offset conduit 802 illustrated in FIG. 20A-20C as used in bubble generator system 840. Additionally, bubble generator system 900 includes a skirt similar to the system 700 illustrated in FIG. 16A. Conduit system 842 further includes a first riser 902 and a second riser conduit 904 extending from conduit portions respectively. The system 840 is simultaneously able to form large bubbles, and pump liquid through offset conduit while passively collecting gas from an existing aeration system.

Referring to FIG. 25A-25E a bubble generator system 960 includes a bubble generator 610 connected to a flexible conduit 670 connected to a gas pump. Bubble generator 610 in one embodiment includes a container 614 having secured to a base 962 such that container and base rise toward the upper liquid when gas accumulates in cavity 674. In one embodiment base 962 has sufficient ballast having a weight to pull the container 614 toward the bottom of the tank when the container is substantially filed with liquid but allows the container 614 to rise predictably as gas accumulates within cavity 674. In one embodiment a tether secures base 962 to the bottom of the tank so that the exit 662 does not reach the upper liquid level. In one embodiment a tether is attached to the top bubble generator system 960 and may be attached to a pulley system. Referring to FIG. 25A container 614 and base 962 are proximate the bottom of the tank when cavity 674 is substantially filled with liquid Referring to FIG. 25B and FIG. 25C as gas accumulates within cavity 674 container 614 rises toward the upper liquid level until a large bubble event is initiated when the accumulated gas reaches the critical level or raises through the column of liquid substantially enough that the gas expands due to static pressure being lowered and causing a large bubble event. Referring to FIG. 25D as gas is released via opening 662 and liquid enters cavity 674 replacing the gas released during the large bubble event container 614 sinks back toward the tank bottom and the process repeats In one embodiment gas is being supplied to cavity 674 via a flexible conduit at a constant rate which can be controlled and/or adjusted by a user. In in the initial position, cavity 674 is substantially filed with liquid and container 614 and base are at a first lowest point in the tank. The lowest point being adjacent to or a first distance from the bottom of the tank. In a second position as gas is introduced into cavity 674 container 614 rises toward the upper liquid surface in a direction opposite the direction of gravity away from the bottom wall. Container 674 will begin to rise only after the buoyancy of the accumulated air is greater than the weight of the container and base. In an uppermost position container is furthest from the bottom of the tank when the level of accumulated gas reaches the critical level that initiates the large bubble event thereby releasing gas through exit 662. As gas exits exit 662 and liquid enters cavity 674 through an opening in container 614 either through an opening proximate the bottom or via a conduit opening the buoyancy of the combined container and base decreases and the container moves back toward the bottom of the container where the cycle repeats itself as long as gas continues to be pumped into cavity 674.

Although top of cover 618 is reference herein, a container with an integral sealed wall portion opposite an open bottom is contemplated and may be exchanged in all of the embodiment described herein. The upper liquid level as described in the various embodiments herein is the level of liquid in the tank in which the bubble generators are located when the tank is filled with liquid. When the bubble generator is positioned within the tank without liquid, the upper liquid level may be replaced for all embodiments with an upper edge or upper free edge of the liquid tank. While the bubble generator may be placed in a tank without liquid, in one embodiment the system operates within a tank filled with liquid, where the liquid level is above the exit opening of cover and/or c Referring to FIG. 12B in one embodiment first path member 626 has a cross section 631 taken from a first edge 980 to a second opposing edge 982 that is generally rectangular. Similarly, second path member 629 has a cross section 633 taken from a first edge 981 to a second opposing edge 983 that is generally rectangular. Stated another way cross sections 631 and 633 include a straight line between edges 980 and 982 as well as between edges 981 and 983. The terminal end of path member 626 has a radius of curvature but the lower most portion defines a straight line between the two longitudinal edges 980 and 982 path member 626. This is in contrast to a pipe in which the cross section is not a rectangle but a circle. In one embodiment path members 624 and path member 626 have a curved cross section between lateral edges. In one embodiment first path member curves in a single degree of freedom. Stated another way first path member does not twist about its longitudinal axis defined as the path extending along a middle of the first path member from a first upper end to a second opposing terminal end.

In one embodiment the bubble generator systems described herein may be used when the tank contains a second gas having a density greater than the gas being pumped into the cavity from the gas pump. In this instance the term liquid can be understood to be the second gas with a density greater than the density of the gas being pumped into the tank.

Referring to FIG. 12B gas path 130 merges with liquid path 678 and merges into a discharge path 679 that extends from the merger of gas path 130 and liquid path 678 toward the exit of the container 614. In one embodiment liquid path and discharge path are defined both by the insert and the inner wall of the container. The term large bubble and large bubble event represent the release of the majority of accumulated gas from any of the large bubble generator systems either existing or discussed herein within a predetermined amount of time. The bubble generator system wherein a controller sends a signal to a relay to change a state of operation of one of a gas pump, mechanical valve and motor.

Although the present disclosure has been described with reference to example embodiments, workers skilled in the art will recognize that changes may be made in form and detail without departing from the spirit and scope of the defined subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described is manifestly intended to be as broad as possible. For example, unless specifically otherwise noted, the definitions reciting a single particular element also encompass a plurality of such particular elements.

The invention claimed is:

1. A bubble generator comprising:
 a container including a side wall and a top wall defining a cavity having a volumetric dimension at an initial pressure;
 an insert located within the cavity defining a gas path with a trap portion, the gas path being in communication with an exit in the container; said insert having a diameter equal to or less than the horizontal plane of the container;
 the cavity including an opening receiving a gas accumulating within the cavity, said cavity capable of receiving said accumulating gas and the gas expanding to a predetermined volume proximate to a trap exit level,
 the gas accumulating within the cavity and displacing a liquid internal to the cavity,
 the gas path of the trap allowing the accumulating gas to escape through the exit once the accumulating gas reaches said predetermined level proximate the trap portion,
 wherein said cavity returning to said initial liquid volume and pressure once the accumulating gas escapes,
 wherein a liquid path merges with the gas path at an acute angle between the trap portion and the exit
 wherein the sum of the cross-sectional area of the liquid path and the cross-sectional area of the gas path at the point of merger of the gas path and the liquid path is equal to or smaller than a cross sectional area of the exit.

2. The bubble generator of claim 1 wherein a portion of the insert is sealingly engaged to the container.

3. The bubble generator of claim 1, wherein at least a portion of the liquid path is defined by the insert and an inner wall of the container.

4. The bubble generator of claim 1, wherein the insert further comprises two facing walls defining the gas path there between, wherein the two facing walls have a non-circular cross section along a majority of the gas path.

5. The bubble generator of claim 4, wherein the two facing walls are spaced from one another, and further including a first path member and a second path member spaced from one another and extending between the two facing walls, wherein the gas path is defined by the region between the two facing walls and the first path member and second path member.

6. The bubble generator of claim 1, wherein gas flows below a terminal bottom end of the insert into the liquid path when the gas path is blocked.

7. The bubble generator of claim 1, wherein the gas path is defined by two curved planar members.

8. The bubble generator of claim 7 wherein the first path member includes a portion defining a curved plane at the region most distal from the top wall.

9. The bubble generator of claim 7 wherein the second path member has a terminal free end having a radius of at least 0.125 inches.

10. The bubble generator of claim 1, further including a conduit having a diameter larger than the opening of the exit, the conduit having a lower terminal end at or below the exit opening, and an upper terminal end positioned above the exit opening, wherein the conduit covers the exit opening and extends radially beyond the outer wall of the container.

11. The bubble generator of claim 1, wherein the container includes an opening adjacent a lower edge of the container receiving gas from an aeration source spaced below and not in contact with the container, the gas from the aeration source entering the container through the opening free of any connecting conduit.

12. The bubble generator of claim 11 wherein liquid is drawn through the lower terminal end of the conduit toward the upper terminal end of the conduit during the escape of the accumulating gas in a large bubble event.

13. The bubble generator of claim 1, wherein an airlift pump is situated wholly within and formed by the container and insert.

14. A method of treating wastewater comprising the steps of: using a bubble generator according to claim 3 to create a large bubble event.

15. The method of claim 14 further comprising the step of: detecting the large bubble event.

* * * * *